United States Patent
Jodet et al.

(10) Patent No.: US 11,885,280 B2
(45) Date of Patent: Jan. 30, 2024

(54) THRUST REVERSER CASCADE INCLUDING ACOUSTIC TREATMENT

(71) Applicant: SAFRAN AIRCRAFT ENGINES, Paris (FR)

(72) Inventors: Norman Bruno André Jodet, Moissy-Cramayel (FR); Jérémy Paul Francisco Gonzalez, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 81 days.

(21) Appl. No.: 17/594,896

(22) PCT Filed: Apr. 3, 2020

(86) PCT No.: PCT/EP2020/059564
§ 371 (c)(1),
(2) Date: Nov. 2, 2021

(87) PCT Pub. No.: WO2020/224888
PCT Pub. Date: Nov. 12, 2020

(65) Prior Publication Data
US 2022/0220923 A1    Jul. 14, 2022

(30) Foreign Application Priority Data

May 3, 2019   (FR) ...................................... 1904658

(51) Int. Cl.
*F02K 1/72*    (2006.01)
*F02C 7/24*    (2006.01)
(Continued)

(52) U.S. Cl.
CPC ................ *F02K 1/72* (2013.01); *B64D 33/06* (2013.01); *F02C 7/24* (2013.01); *F02K 1/827* (2013.01);
(Continued)

(58) Field of Classification Search
CPC ... F02K 1/72; F02K 1/827; F02C 7/24; B64D 33/06; F05D 2220/323; F05D 2260/57; F05D 2260/96; F05D 2260/963
See application file for complete search history.

(56) References Cited

U.S. PATENT DOCUMENTS

2001/0017232 A1*   8/2001   Hogeboom ............. F02K 1/827
                                                           181/210
2002/0092948 A1    7/2002   Dugan
(Continued)

FOREIGN PATENT DOCUMENTS

EP    1978232 A2    10/2008
EP    1978232 A3    12/2012
(Continued)

OTHER PUBLICATIONS

French Search Report issued in FR1904658 dated Jan. 23, 2020 (2 pages).
(Continued)

*Primary Examiner* — Andrew H Nguyen
(74) *Attorney, Agent, or Firm* — Bookoff McAndrews, PLLC (57) ABSTRACT

A cascade type thrust reverser device for a turbomachine of an aircraft, comprising a thrust reverser cascade and a casing, the cascade including first cavities, and the casing comprising an opening defining a housing wherein said cascade can be inserted in a first direction, and the casing and said cascade being in relative translation with respect to one another in the first direction between a first position of the device in which the cascade is entirely positioned in the housing and a second position of the device in which said cascade is at least partially outside said housing. The casing comprises an acoustic treatment panel including second cavities extending in a second plane parallel to the first (Continued)

plane, each first cavity facing a second cavity when the device is in the first position to form an acoustic treatment cell.

16 Claims, 8 Drawing Sheets

(51) Int. Cl.
   *F02K 1/34* (2006.01)
   *F02K 1/82* (2006.01)
(52) U.S. Cl.
   CPC .. *F05D 2220/323* (2013.01); *F05D 2250/713* (2013.01); *F05D 2260/963* (2013.01)

(56) References Cited

U.S. PATENT DOCUMENTS

| | | | | |
|---|---|---|---|---|
| 2008/0072571 | A1* | 3/2008 | Beardsley | F02K 1/72 60/226.2 |
| 2009/0250293 | A1* | 10/2009 | Gleine | B32B 5/024 181/290 |
| 2013/0092755 | A1* | 4/2013 | Aten | F02K 1/72 239/265.33 |
| 2015/0252751 | A1* | 9/2015 | Baltas | F02C 7/24 60/771 |
| 2016/0076487 | A1 | 3/2016 | Nakhjavani | |
| 2018/0010798 | A1* | 1/2018 | Pettersson | F02K 1/827 |
| 2018/0245516 | A1* | 8/2018 | Howarth | B32B 27/06 |
| 2018/0372024 | A1* | 12/2018 | Pautis | F02K 1/72 |
| 2019/0032601 | A1* | 1/2019 | Harpal | F02K 1/763 |
| 2020/0070993 | A1* | 3/2020 | Porte | F02C 7/045 |

FOREIGN PATENT DOCUMENTS

| | | |
|---|---|---|
| FR | 3007799 A1 | 1/2015 |
| FR | 3039517 A1 | 2/2017 |

OTHER PUBLICATIONS

International Search Report issued in PCT/EP2020/059564 dated Aug. 13, 2020 with English Translation (6 pages).
Written Opinion of the International Searching Authority issued in PCT/EP2020/059564 (6 pages).

* cited by examiner

THRUST REVERSER CASCADE INCLUDING ACOUSTIC TREATMENT

CROSS-REFERENCE TO RELATED APPLICATIONS

This patent application is the U.S. National Stage entry under 35 U.S.C. § 371 of International Patent Application No. PCT/EP2020/059564, filed on Apr. 3, 2020, which claims the benefit of priority to French Patent Application No. 1904658, filed on May 3, 2019.

TECHNICAL FIELD

The invention relates to the acoustic treatment of sound waves emitted by a turbomachine of an aircraft, and more particularly to the treatment of sound waves at the thrust reversers of the turbomachine.

PRIOR ART

When a turbomachine is in operation, the interaction between the flow and the solid portions of the turbomachine are responsible for the generation of noise which propagates on either side of the turbomachine.

One of the means of attenuating this acoustic radiation is to integrated acoustic treatment means in the surfaces in contact with the sound waves.

Conventionally, the acoustic treatment of a turbojet, and more precisely of the noise radiated by the interaction of the rotor and its environment, is accomplished by means of absorbing panels positioned at the wetted surfaces of the duct in which the sound waves propagate. What is meant by wetted surfaces are the surfaces in contact with a fluid flow. These panels are generally composite material of the sandwich type confining a honeycomb forming acoustic absorption cells.

Known for example in the prior art are acoustic panels with a single degree of freedom, or SDOF, which have a conventional honeycomb acoustic treatment structure lining the walls of the nacelle of a turbomachine.

Because of the principle of operation of the technologies of the acoustic treatment panel using resonant cavities, the radial bulk, i.e. the radial thickness, of the acoustic treatment panels depends on the treatment frequency targeted for obtaining the maximum effectiveness in acoustic attenuation.

However, engine architectures increasingly have speeds of rotation of the bladed wheels that are slower and slower, and a number of blades on the bladed wheels that are smaller and smaller, which causes a reduction in the dominant frequencies of the noise associated with the module comprising the fan and the straightener stage, or fan-OGV for "outlet guide vane" module. As a result, matching between the optimal thickness of the acoustic panels and the volume available in the nacelles is currently not satisfied.

To slow down an aircraft, a turbomachine generally comprises thrust reversers. There exist primarily two technologies of thrust reverser that are based on the action of a cascade. Two types of cascade type thrust reversers are distinguished: fixed cascade type thrust reversers and cascade type thrust reversers with a sliding connection.

Figure 1A:
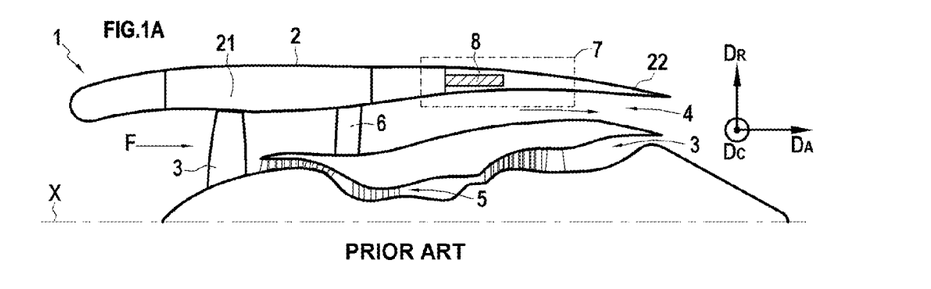
FIGS. 1A and 1B, already described, show schematic section views in a longitudinal plane of a turbomachine according to a first known embodiment of the prior art, respectively in a position in which the thrust reversal is inactive and in a position in which the thrust reversal is activated.
Figure 1B:
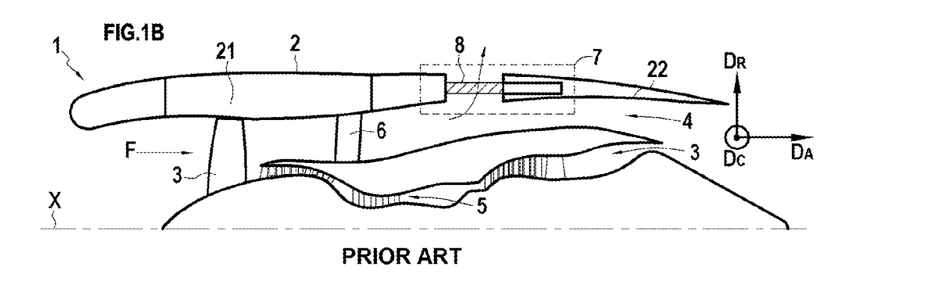

Schematic section views are shown in FIGS. 1A and 1B in a horizontal plane of a turbomachine 1 according to a first known embodiment of the prior art, respectively in a position in which the thrust reversal is inactivated and in a position in which the thrust reversal is activated.

The turbomachine 1 comprises a nacelle 2 with axial symmetry around an axis X defining an axial direction $D_A$, a radial direction $D_R$ and a circumferential direction $D_C$, a fan 3, a primary stream 4, a secondary stream, a primary straightener stage 5, a secondary straightener stage 6, and a cascade type thrust reverser device 7 including a cascade 8.

As illustrated in FIGS. 1A and 1B, which show a turbomachine provided with a fixed cascade type thrust reverser, in fixed cascade thrust reversers the cascade 8 is embedded in, i.e. secured to an upstream portion 21 of the nacelle 2 and in sliding connection with a downstream portion 22 of the nacelle 2, upstream and downstream being defined with respect to the flow direction of a gas flow F in the turbomachine 1. Translating downstream, the downstream portion 22 of the nacelle 2 uncovers the cascade 8 which becomes the only interface between the flow internal to the nacelle 2 and the surrounding medium in which the turbomachine 1 moves.

Figure 2A:
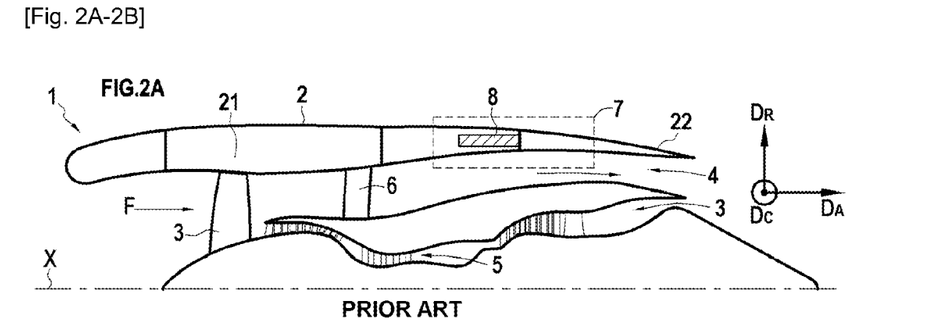
FIGS. 2A and 2B, already described, show schematic section views in a longitudinal plane of a turbomachine according to a second known embodiment of the prior art, respectively in a position in which the thrust reversal is inactive and in a position where the thrust reversal is activated.
Figure 2B:
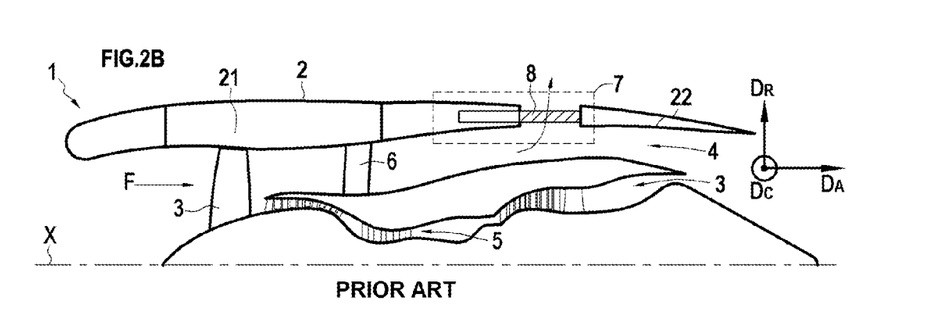

Schematic section views are shown in FIGS. 2A and 2B in a horizontal plane of a turbomachine 1 according to a second embodiment of the prior art, respectively in a position in which the thrust reversal is inactivated and in a position in which the thrust reversal is activated.

As illustrated in FIGS. 2A and 2B which show a turbomachine 1 provided with a cascade type thrust reverser with a sliding connection, in a fixed cascade thrust reverser the cascade 8 is in sliding connection with respect to the upstream portion 21 of the nacelle 2 and in embedded connection with respect to the downstream portion 22 of the nacelle 2. Translating downstream, the downstream portion 22 of the nacelle 2 drives the cascade 8 out of the nacelle 2 to position it at the interface between the flow internal to the nacelle 2 and the ambient medium.

Thrust reversers represent both a cost, a mass and a bulk that are very penalizing for the performance of the propulsive assembly, while they are used only at the end of the landing phase. The volume that they use in the nacelle can in particular not be used in the prior art, for acoustic treatment of the sound waves emitted by the turbomachine.

In the propulsive assembly architectures using door type thrust reversers which are deployed inside the secondary flow to deflect the flow upstream outside the nacelle, a known practice for integrated the conventional acoustic treatment consists of integrating acoustic panels in the cavities of the reverser doors. This practice consists simply of integrating conventional absorbing panels into the available volumes, as is done in the fan casing.

DISCLOSURE OF THE INVENTION

The invention seeks to supply a cascade type thrust reverser which allows both reorienting a flow of air upstream of the turbomachine outside the nacelle and minimizing the head losses through the cascade when the thrust reversal is activated, and maximizing the effectiveness of acoustic absorption when the thrust reversal is inactive.

One object of the invention proposes a cascade type thrust reverser device for a turbomachine of an aircraft, the device comprising a thrust reverser cascade and a casing. The cascade extends in a first plane defining a first direction and a second direction and includes first cavities. The casing comprises an opening extending in a plane orthogonal to said first direction and defining a housing in which said cascade can be inserted in said first direction. The casing and the cascade are in relative translation with respect to one another in the first direction between a first position of the thrust reverser device in which the cascade is entirely positioned in the housing and a second position of the thrust reverser device in which said cascade is at least partially outside said housing.

According to a general characteristic of the invention, the casing comprises an acoustic treatment panel including second cavities extending in a second plane parallel to the first plane, each first cavity facing a second cavity when the thrust reverser device is in the first position to form an acoustic treatment cell.

The thrust reverser cascade can be formed by an annular one-piece cascade or by a plurality of cascade sections which can be assembled together to form a hollow cylinder with a circular or polygonal base.

Likewise, the acoustic treatment panel can be formed by a single-piece annular panel or by a plurality of panel sections which can be assembled together to form a hollow cylinder with a circular or polygonal base.

A thrust reverser cascade is usually characterized by a metallic structure, dimensions to as to withstand the aerodynamic load to which it is subjected during the thrust reversal phase. This structure also generates head losses. A cell is a volume consisting of four walls through which a fluid can circulate. Having too great a density of cells can impair the effectiveness of the thrust reverser due to the fact of too great a resistance to the passage of air.

On the other hand, acoustic panel structures are not subjected to aerodynamic loads. The partitions which constitute them are very thin and their low volume allows optimizing the tuning of the panel, i.e. the maximum attenuation frequency.

The two functions of thrust reversal and acoustic treatment therefore call on very different cell structures.

When the cascade type thrust reverser device is mounted on a turbojet, the first direction corresponds to an axial direction of the turbojet and the second direction corresponds to a circumferential direction of the turbojet when the cascade is at least partially annular or to a direction tangent to the circumferential direction of the turbojet when the cascade is flat, in other words not curved.

When the thrust reverser device is in its first position in which the thrust reversal is inactive, the first cavities of the cascade thus continue the second cavities of the acoustic treatment panel, the second cavities being resonant cavities. The superposition of the first cavities and the second cavities in a direction orthogonal to the first plane, for example in a radial direction, allows forming acoustic treatment cells the height of which is greater than the height of the second cavity in the direction orthogonal to the first plane. The acoustic treatment cell thus formed by the superposition of a second and of a first cavity comprises a treatment height allowing, on the one hand, increasing the absorption of acoustic waves and, on the other hand, absorbing acoustic waves of lower frequencies than with only the acoustic treatment panel.

In a first aspect of the thrust reverser device, the thrust reverser cascade can comprise first partitions positioned successively in a first direction and parallel to one another and first transverse partitions intersecting said first partitions and each extending in planes parallel to one another and parallel to the first direction. The acoustic treatment panel can comprise second partitions positioned successively in the first direction and parallel to one another and second transverse partitions intersecting said second partitions and each extending in planes parallel to one another and parallel to the first direction, the first cavities each being defined by two first partitions and two first transverse partitions, the second cavities each being defined by two second partition and two second transverse partitions. Each first partition can be positioned in the continuation of a second partition in a direction intersecting the first plane and each first transverse partition can be positioned in the continuation of a second transverse partition in said direction intersecting the first plane when the thrust reverser device is in said first position.

The first partitions are intended to be oriented in a direction intersecting the flow direction of a gas flow inside a turbomachine including a thrust reverser device provided with a cascade of this type. When the cascade is mounted on a thrust reverser device on a turbomachine, the first partitions, oriented in an azimuthal or radial direction of the turbomachine, are indispensable for guaranteeing the functionality of thrust reversal. In fact, it is due to these first partitions that the flow of air circulating in a stream, inside the nacelle in which the thrust reverser device is mounted, can be captured and reoriented upstream of the turbomachine, with respect to the flow direction of the flow inside the nacelle, outside the nacelle.

The first transverse partitions are intended to be oriented in the direction of the gas flow inside a turbomachine including a thrust reverser device provided with a cascade of this type. When the cascade is mounted on a thrust reverser device on a turbomachine, the first transverse partitions, oriented in an axial direction of the turbomachine, are not indispensable for the functionality of thrust reversal. On the other hand, they allow the formation of resonant cavities allowing attenuating acoustic waves generated by the turbomachine.

In a second aspect of the thrust reverser device, the second partitions of the acoustic treatment panel can comprise a first end facing said thrust reverser cascade and a second end opposite to the first end. And for each second partition, the tangent to the second partition at the second end of the second partition can form a first angle with a plane parallel to said first plane when the thrust reverser device is in said first position, the first angle being comprised between 60° and 120°.

This orientation of the second partitions of the acoustic treatment panel to an end opposite to the end facing the thrust reverser cascade allows defining a substantially radial orientation of the acoustic treatment cells, to avoid penalizing the operation of the resonator due to undesired acoustic reflections on the partitions.

The second partitions of the acoustic treatment panel can thus be curved with possibly one or more inflection points. The use of second curved partitions in the acoustic treatment panel allows maximizing the effectiveness of the acoustic treatment without degrading the functionality of the thrust inversion of the cascade regardless of the positioning of the panel with respect to the cascade in the direction orthogonal to the first plane.

The second end of the second partitions can thus either be at the inlet to the acoustic treatment cell or at the outlet of the acoustic treatment cell, depending on the positioning of the acoustic treatment panel with respect to the thrust reverser cascade in a direction perpendicular to the first plane, i.e. in the radial direction.

In a third aspect of the thrust reverser device, the first partitions of the thrust reverser cascade can comprise a first end facing the acoustic treatment panel and a second end opposite to the first end. And for each first partitions, the tangent to the first partition at the first end of the first partition can form a second angle with the tangent to the second partition at the first end of the second partition when the thrust reverser device is in said first position, the second angle being comprised between −20° and +20°.

This orientation of the first partitions of the thrust reverser cascade and one end facing the acoustic treatment panel allows defining a relatively small gap regarding the orientation of the cells at the interface between the thrust reverser cascade and the acoustic treatment panel, and thus avoiding penalizing the operation of the resonator due to undesired acoustic reflections on the partitions, without perturbing the functionality of thrust reversal.

In a fourth aspect of the thrust reverser device, the first partitions of the cascade can comprise a first curvature in the direction orthogonal to said first plane and the second partitions of the panel can comprise a second curvature in the direction orthogonal to said first plane distinct from the first curvature. The acoustic treatment cells formed in the first position of the thrust reverser device can comprise two undulated walls orthogonal to the first direction and each formed by a first partition and a second partition in the continuation of one another.

Said two walls of an acoustic treatment cell thus have an undulation, i.e. a curve with an inflection point which allows maximizing the acoustic absorption by the cell while still retaining the effectiveness of the thrust reversal of the thrust reverser cascade when the latter is used for thrust reversal.

In a fifth aspect of the thrust reverser device, the first cavities and the second cavities can have the same shape in a section plane parallel to said first plane.

In a sixth aspect of the thrust reverser device, the casing can also comprise a porous interface with a thickness comprised between 0.5 and 20 mm, formed of at least one layer of porous material and positioned at the interface between the acoustic treatment panel and the cascade when the thrust reverser device is in the first position, the thickness extending in a direction perpendicular to said first plane.

The addition of a porous interface allows improving the interface between the two cellular structures, namely the acoustic treatment panel and the thrust reverser cascade, while ensuring better sealing at the junctions between the partitions of the acoustic treatment panel and the partitions of the thrust reverser cascade, while still offering useful clearance to improve the sliding of the thrust reverser cascade at the time when the thrust reverser function is used, i.e. when the device is in the second position.

In a seventh aspect of the thrust reverser device, the acoustic treatment cells can comprise a height comprised between 10 and 100 mm, the height being measured in a direction perpendicular to the first plane.

In an eighth aspect of the thrust reverser device, the casing can comprise a perforated wall and an acoustically reflecting wall each extending parallel to said first plane, the cascade and the acoustic treatment panel being positioned between the perforated wall and the acoustically reflecting wall when the thrust reverser device is in the first position.

In a ninth aspect of the thrust reverser device, the perforated wall can be directly assembled by gluing, i.e. directly glued on, to said cascade or said one acoustic treatment panel.

In a tenth aspect of the thrust reverser device, the acoustic treatment panel can be positioned between the perforated wall and the thrust reverser cascade when the thrust reverser device is in the first position.

In an eleventh aspect of the thrust reverser device, the acoustic treatment panel can be positioned between the acoustically reflecting wall and the thrust reverser cascade when the thrust reverser device is in the first position.

In a twelfth aspect of the thrust reverser device, the cascade can be movable and the casing fixed to use the thrust reverser device in a turbomachine provided with a cascade type thrust reverser with a sliding connection, or the cascade can be fixed and the casing movable to use the thrust reverser device in a turbomachine provided with a fixed cascade thrust reverser.

In another object of the invention, a turbomachine is proposed which is intended to be mounted on an aircraft, the turbomachine comprising an axially symmetrical nacelle defining an axial direction and a radial direction, the nacelle including a thickness in the radial direction and a housing extending in the axial direction in its thickness to accommodate a cascade of a cascade type thrust reverser device.

According to a general feature of this object of the invention, the turbomachine can comprise a cascade type thrust reverser device as defined above, the cascade being positioned, when the thrust reversal is not required, in the corresponding housing of the nacelle of the turbomachine.

In another object of the invention, an aircraft is proposed comprising at least one turbomachine as defined above.

BRIEF DESCRIPTION OF THE DRAWINGS

The invention will be better understood upon reading performed hereafter, by way of indication and without limitation, with reference to the appended drawings in which.

DESCRIPTION OF THE EMBODIMENTS

In FIGS. 3 to 12, the turbomachine 1 comprises a thrust reverser device 70 which can operate according to the operation described in FIGS. 2A and 2B. The turbomachine comprises a nacelle with axial symmetry around an axis X defining an axial direction $D_A$, a radial direction $D_R$ and a circumferential direction $D_C$.

Figure 3:
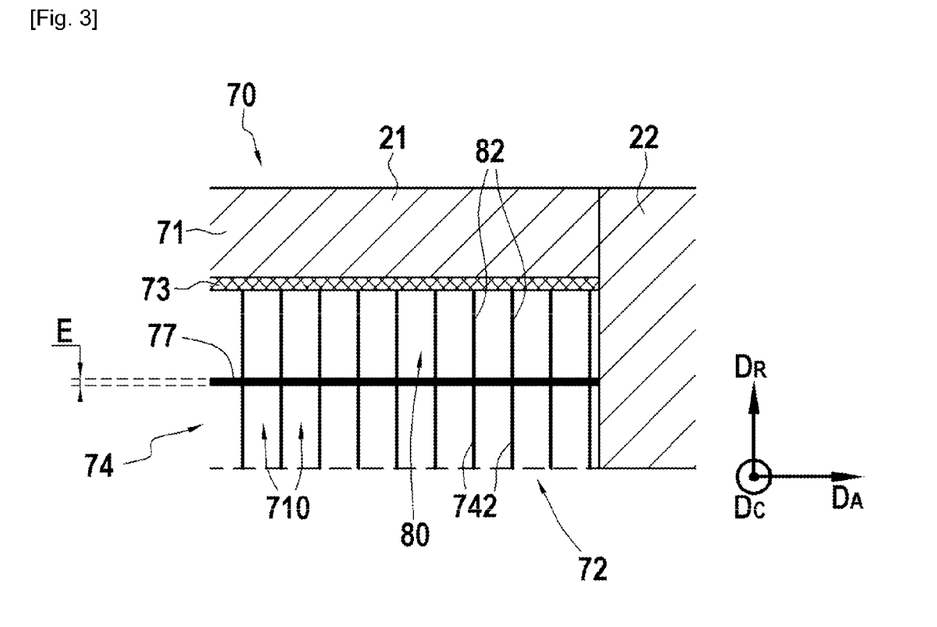
FIG. 3 shows a schematic section view in a plane comprising the axial direction and the radial direction of a cascade type thrust reverser device in a position in which the thrust reversal is inactive according to a first embodiment of the invention.
Figure 4:
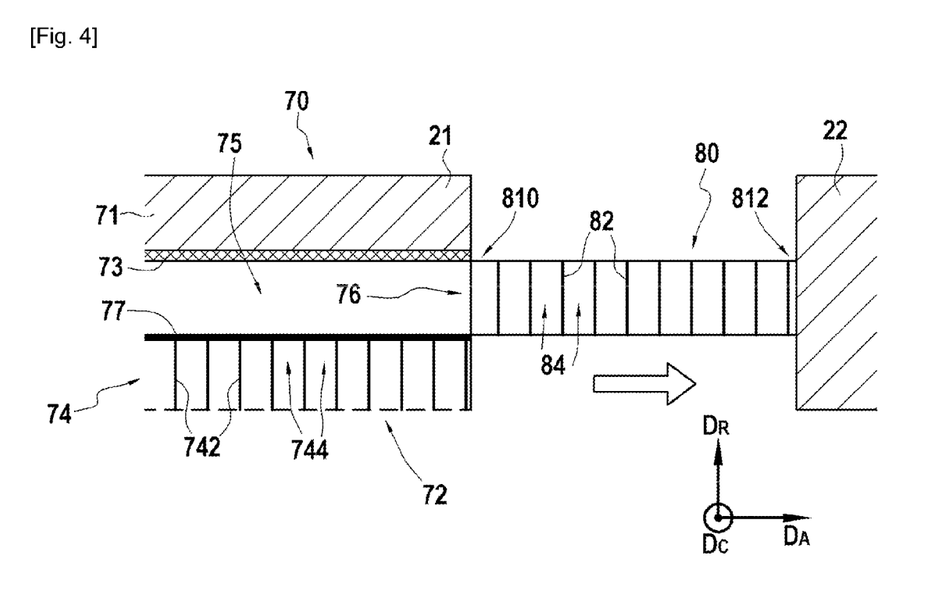
FIG. 4 shows a schematic section view in a plane comprising the axial direction and the radial direction of a cascade type thrust reverser device in a position in which the thrust reversal is activated according to a first embodiment of the invention.

Shown in FIGS. 3 and 4 are schematic section views in a plane comprising the axial direction and the radial direction of a cascade type thrust reverser device mounted on an aircraft turbomachine according to a first embodiment of the invention and respectively in a position in which the thrust reversal is inactive and in a position in which the thrust reversal is activated.

The thrust reverser device 70 comprises a plurality of cascades 80 assembled to form a cascade ring. The ring can have a cylindrical base or a polygonal base, the cascades 80 extending respectively either in a curved plane comprising the axial direction $D_A$ and the circumferential direction $D_C$ of the turbomachine, or in a straight plane comprising the axial direction $D_A$ and a direction tangent to the circumferential direction $D_C$.

In the embodiments illustrated, the cascades 80 are curved to facilitate the explanation and the labels, and extend mainly in a curved plane, hereafter called the first plane, comprising the axial direction $D_A$ and the circumferential direction $D_C$.

Figure 5:
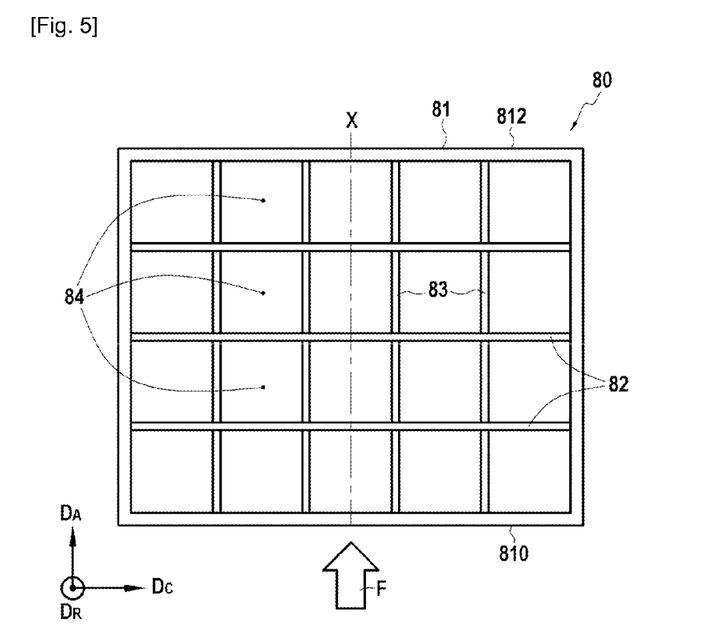
FIG. 5 illustrates schematically a section view in a plane comprising the axial direction and the circumferential direction of a cascade of the thrust reverser device.

As shown in FIG. 5, which is a section view of a cascade 80 in a section plane parallel to the first plane, each cascade 80 comprises a frame 81 inside which extend first partitions 82 in the circumferential direction $D_C$ and first transverse partitions 83 in the axial direction $D_A$. The frame 81, the first partitions 82 and the first transverse partitions 83 have a height in the radial direction $D_R$ comprised between 5 mm and 50 mm.

The thickness of the first partitions 82 is comprised between 0.5 mm and 5 mm to be sufficiently thick to withstand the loads to which they are subjected, but also as thin as possible to minimize the mass and the head losses in the cascade.

The first partitions 82 are azimuthal partitions intended to orient the gas flow F toward the outside of the nacelle 2 and upstream of the turbomachine 1 for the reversal of thrust when the thrust reverser device is activated. The first transverse partitions 83 are axial partitions intended to define, with the first partitions 82, first cavities 84 for the absorption of acoustic waves generated by the turbomachine, when the thrust reverser device is inactive.

The distance in the circumferential direction $D_C$ separating two first transverse partitions 83 adjacent to one another is equal to the distance in the axial direction $D_A$ separating two first partitions 82, to thus favor acoustic propagation in plane waves inside the cavities.

The cascade 80 comprises, in the axial direction $D_A$ of the turbomachine 1 on which the device 70 is mounted, a first axial end 810 and a second axial end 812. As illustrated in FIGS. 3 and 4, in the embodiments illustrated in FIGS. 3 to 12 and being able to operate according the operation described in FIGS. 2A and 2B, the second axial end 812 of the cascades 80 is fixed to a downstream portion 22 of the nacelle 2 movable with respect to an upstream portion 21 of the nacelle 2.

Housed in the upstream portion 21 of the nacelle 2 of the turbomachine 1, the thrust reverser device 70 comprises a plurality of casings 71 assembled to form a panel ring. The ring can have a cylindrical base or a polygonal base, the casings 71 extending respectively either in a curved plane comprising the axial direction $D_A$ and the circumferential direction $D_C$ of the turbomachine 1, or in a straight plane comprising the axial direction $D_A$ and a direction tangent to the circumferential direction $D_C$.

In the embodiments illustrated, the casing's 71 are curved to facilitate the explanation and the labels, and extend mainly in a curved plane comprising the axial direction $D_A$ and the circumferential direction $D_C$.

Each casing 71 includes a perforated wall 72, an acoustically reflecting wall 73 and an acoustic treatment panel 74. The casing 71 comprises successively in the radial plane $D_R$ moving away from the axis of revolution of the turbomachine 1, the perforated wall 72, the acoustic treatment panel 74, a housing 75 configured to accommodate the cascade 80, and the acoustically reflecting wall 73.

The casing 71 also comprises an opening 76 communicating with the housing 75, the opening extending in a plane comprising the radial direction $D_R$ and the circumferential direction $D_C$ at an axial end of the casing 71 facing the downstream portion 22 of the nacelle 2.

When thrust reversal is inactive, the thrust reverser device 70 is in a first position illustrated in FIG. 3 in which the cascade 80 is positioned in the housing 75 of the casing 71.

When thrust reversal is activated, the thrust reverser device 70 is in a second position illustrated in FIG. 4 in which the cascade 80 is extracted from the casing 71 in the axial direction $D_A$ in translation with the downstream portion 22 of the nacelle, leaving the housing 75 free, at least in part.

The acoustic treatment panel 74 is positioned in the casing 71 in a second plane parallel to the first plane in which the cascade 80 extends, and the acoustic panel 74 glued to the perforated wall 72.

The acoustic treatment panel 74 of each casing 71 comprises second partitions 742 and second transverse partitions.

Figure 6:
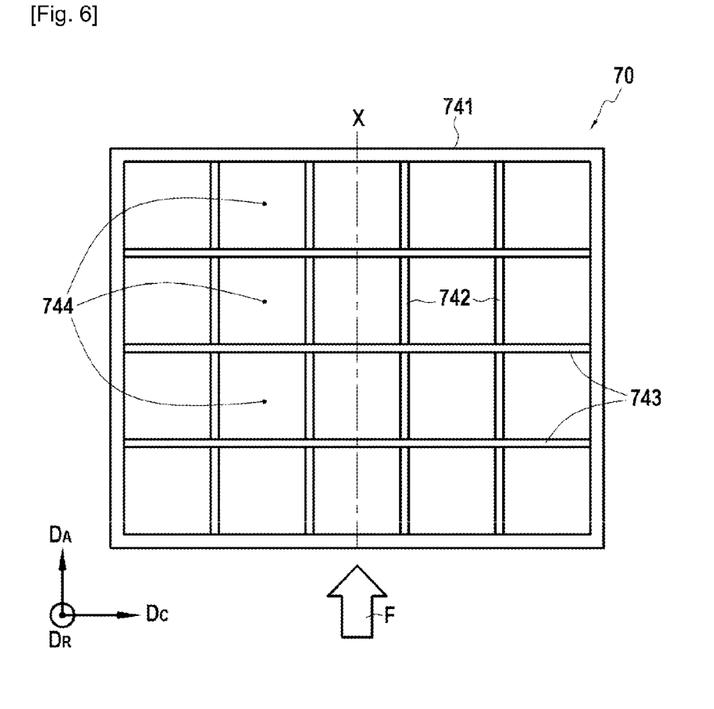
FIG. 6 illustrates schematically a section view in a plane comprising the axial direction and the circumferential direction of an acoustic treatment panel of the thrust reverser device.

As shown in FIG. 6, which is a section view of an acoustic treatment panel 74 in a section plane parallel to the first plane, each acoustic treatment panel 74 comprises a frame 741 inside which extend second partitions 742 in the circumferential direction $D_C$ and second transverse partitions 743 in the axial direction $D_A$.

The second partitions 742 are azimuthal partitions and the second transverse partitions 743 are axial partitions. The second partitions 742 and the second transverse partitions 743 define between them second cavities 744 for the absorption of acoustic waves generated by the turbomachine, when the thrust reverser device is in its first position.

The distance in the circumferential direction $D_C$ separating two second transverse partitions 743 adjacent to one another is equal to the distance in the axial direction $D_A$ separating two second partitions 742, to thus favor acoustic propagation in plane waves inside the cavities.

In addition, at the interface between the acoustic treatment panel 71 and the cascade 80, each casing 70 comprises a porous interface 77 formed of several layers of porous material and having a thickness E in the radial direction $D_R$ comprised between 0.5 mm and 20 mm to improve the interface between the two cellular structures by ensuring better sealing between the different partitions while still facilitating the sliding of the cascade 80 in the housing 75 during translations.

When the thrust reverser device 70 is in its first position, as illustrated in FIG. 3, the first cavities 84, the first partitions 82 and the first transverse partitions 83 are superimposed respectively with the second cavities 744, the second partitions 742 and the second transverse partitions 743, and thus form resonant cavities 710, or acoustic treatment cells, the volume of each of which corresponds to the sum of the volume of a first cavity 84 and the volume of a second cavity 744. The acoustic treatment cells 710 thus extend at a height H in the radial direction $D_R$ corresponding to the sum of the height of the acoustic treatment panel 74, the thickness E of the porous interface 77 and the height of the cascade 80. The height H of the acoustic treatment cells is comprised between 10 mm and 100 mm.

In the first embodiment illustrated in FIGS. 3 and 4, the first cavities 84 and the second cavities 744 have an identical shape in a section plane comprising the axial direction $D_A$ and the circumferential direction $D_C$, with first partitions 82 and second partitions 742 each extending purely radially. Thus, in the first position of the thrust reverser device 70, each of the first transverse partitions 83 is not only in the continuation of one of the second transverse partitions 743, but more precisely is aligned with one of the second transverse partitions 743.

Figure 7:
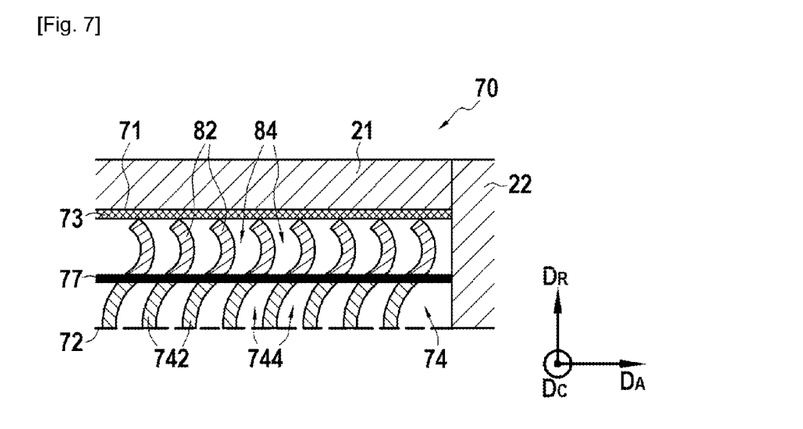
FIG. 7 shows a schematic section view in a plane comprising the axial direction and the radial direction of a thrust reverser device in a position in which the thrust reversal is inactive according to a second embodiment of the invention.
Figure 8:
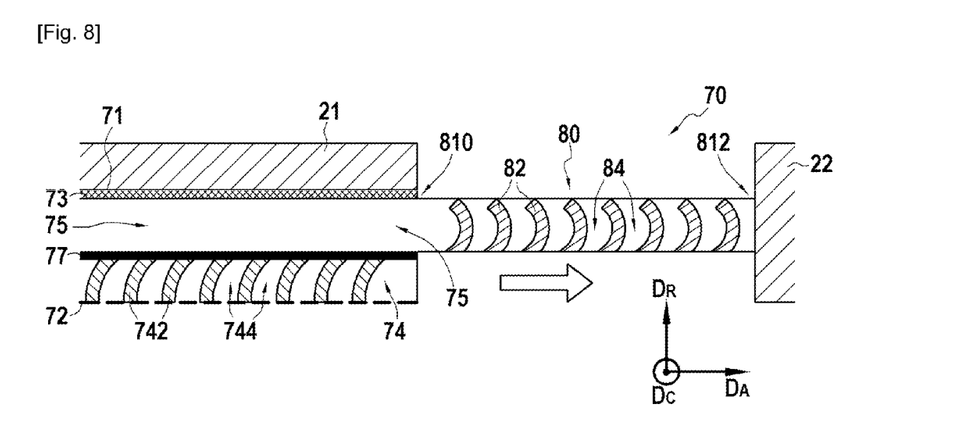
FIG. 8 shows a schematic section view in a plane comprising the axial direction and the radial direction of a cascade type thrust reverser device in a position in which the thrust reversal is activated according to a second embodiment of the invention.

Shown in FIGS. 7 and 8 are schematic section views in a plane comprising the axial direction and the radial direction of a cascade type thrust reverser device 70 mounted on an aircraft turbomachine according to a second embodiment of the invention and respectively in a position in which the thrust reversal is inactive and in a position in which the thrust reversal is activated.

The thrust reverser device 70 of the second embodiment illustrated in FIGS. 7 and 8 differs from the first embodiment illustrated in FIGS. 3 and 4 in that the first transverse partitions 83 of the cascade 80 and the second transverse partitions 743 of the acoustic treatment panel 70 each have a curvature in a section plane comprising the radial direction $D_R$ and the axial direction $D_A$ unlike the first embodiment where the partitions are rectilinear in the radial direction $D_R$, i.e. where they extend radially.

Figure 9:
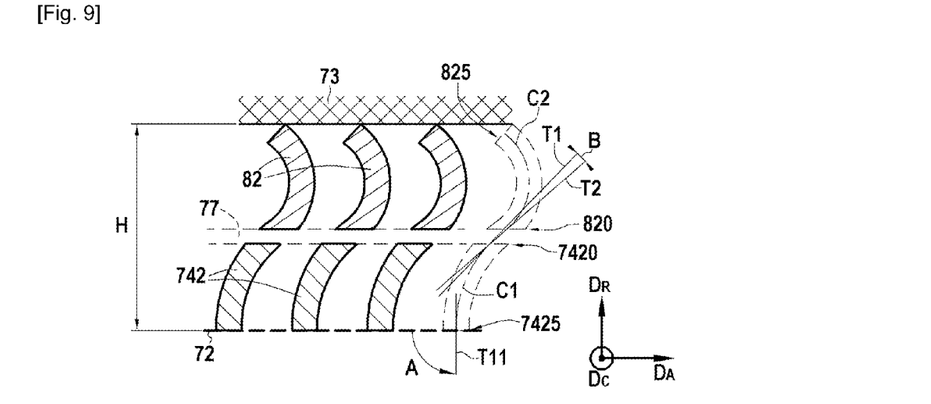
FIG. 9 is a zoom of FIG. 7 illustrating the arrangement of the first partitions and the second partitions in the first position of the device.

As illustrated in FIG. 9, which is a zoom of FIG. 7 illustrating the arrangement of the first partitions 82 and of the second partitions 742 in the first position of the thrust reverser device 70 in the second embodiment, the curvature of the second partitions 742 of the acoustic treatment panel 74 is shown in FIG. 9 by a first curve C1, and the curvature of the first partitions 82 of the cascade 80 is shown by a second curve C2.

If it is considered that each partition 742 and 82 is formed by the radial stacking of an infinity of cross sections, taken in a plane orthogonal to the radial direction $D_R$, it is possible to define a curve passing through the center of each cross section and extending over the entire height H of the acoustic treatment cell 710 which is formed by the assembly of the first curve C1 with the second curve C2 over the height H of the acoustic treatment cell 7.

The second partitions 742 of the acoustic treatment panel 74 comprise a first end 7420 facing said thrust reverser cascade 80 and a second end 7425 opposite to the first end 7420 and facing the porous wall 72.

And the first partitions 82 of the cascade 80 each comprise a first end 820 facing the acoustic treatment panel 74 and a second end 825 opposite to the first end 820 and facing the acoustically reflecting wall 73.

The second end 7425 of the second partitions 742 is thus at the inlet of the acoustic treatment cell 710.

In addition, for each second partition 742, in a section plane comprising the axial direction $D_A$ and the radial direction $D_R$, the tangent T11 to the second partition 742 taken at the second end 7425 forms a first angle A with a plane parallel to said first plane comprised between 60° and 120°, the perforated wall 72 extending in said first plane to the second end 7425 of the second partition 742.

This orientation of the second partitions 742 of the acoustic treatment panel 74 at their second end 7425, which faces the flow circulating inside the nacelle, allows defining a substantially radial orientation of the acoustic treatment cells 710, to avoid penalizing the operation of the resonator due to undesired acoustic reflections on the partitions.

The second partitions 742 of the acoustic treatment panel are therefore curved. The use of curved second partitions 742 in the acoustic treatment panel 74 allows maximizing the effectiveness of the acoustic treatment without degrading the functionality of thrust reversal of the cascade regardless of the positioning of the panel with respect to the cascade in the direction orthogonal to the first plane.

In addition, for each first partition 82, in a section plane comprising the axial direction $D_A$ and the radial direction $D_R$, the tangent T2 to the first partition 82 at its first end 820 forms a second angle B with the tangent T1 to the second partition 742 at the first end 7420 when the thrust reverser device 70 is in said first position. The second angle B is comprised between −20° and +20°.

The first curve C1 defines a first angle A with the first plane. The first angle A is formed between the first plane and the tangent to the end of the first curve C1 opposite to the end facing the second curve C2.

This orientation of the first partitions 82 of the thrust reverser cascade 80 and of the second partitions 742 at the location where they face one another, i.e. at the interface between the cascade and the panel 74, allowing having continuity of the acoustic treatment cells 710 and thus avoid penalizing the operation of the resonator due to undesired acoustic reflections on the partitions, without perturbing the functionality of thrust reversal.

The first partitions 82 of the thrust reverser cascade 80 all having the same shape and the second partitions 742 of the acoustic treatment panel 74 also all having the same shape, the acoustic treatment cells 710 all have the same profile, this profile following the profile of the first and second partitions 82 and 742.

The first and second curves C1 and C2 define the second angle B. The second angle B is formed between the tangent to the first curve C1 at the end of the first curve C1 facing the second curve C2 and the tangent to the second curve C2 at the end of the second curve C2 facing the first curve C1.

Figure 10:
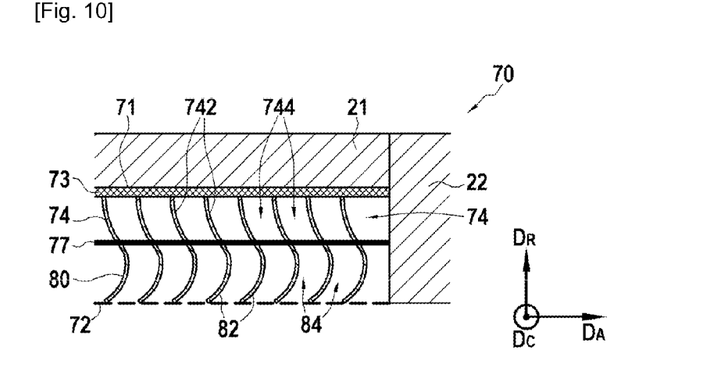
FIG. 10 shows a schematic section view in a plane comprising the axial direction and the radial direction of a cascade type thrust reverser device in a position in which the thrust reversal is inactive according to a third embodiment of the invention.
Figure 11:
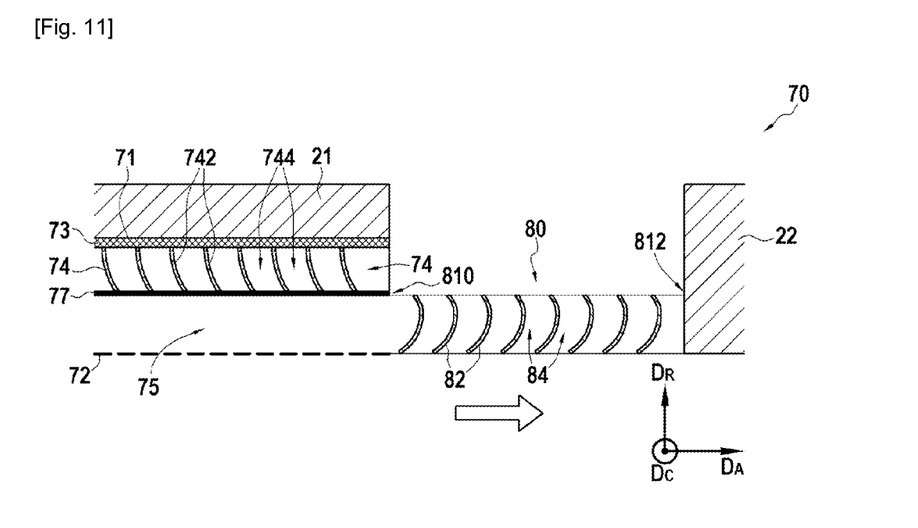
FIG. 11 shows a schematic section view in a plane comprising the axial direction and the radial direction of a cascade type thrust reverser device in a position in which the thrust reversal is activated according to a third embodiment of the invention.

In FIGS. 10 and 11 are shown schematic section views in a plane comprising the axial direction and the radial direction of a cascade type thrust reverser device 70 mounted on an aircraft turbomachine 14 according to a third embodiment of the invention and respectively in a position in which the thrust reversal is inactive and in a position in which the thrust reversal is activated.

The thrust reverser device 70 of the third embodiment illustrated in FIGS. 10 and 11 differs from the second embodiment illustrated in FIGS. 7 and 8 in that the positions in the radial direction $D_R$ of the acoustic treatment panel 74 and of the cascade 80 are reversed.

In the third embodiment, the cascade 80 is, in the radial direction $D_R$, inside the acoustic treatment panel 74. Thus, in the first position of the thrust reverser device 70 illustrated in FIG. 10, the cascade 80 extends in the radial direction $D_R$ between the perforated wall 72 of the casing 71 and the acoustic treatment panel 74, the porous interface 77 extending between the panel 74 and the cascade 80 in the radial direction $D_R$.

As for the second embodiment, the first transverse partitions 83 of the cascade 80 and the second transverse partitions 743 of the acoustic treatment panel 70 each have a curvature in a section plane comprising the radial direction $D_R$ and the axial direction $D_A$.

Figure 12:
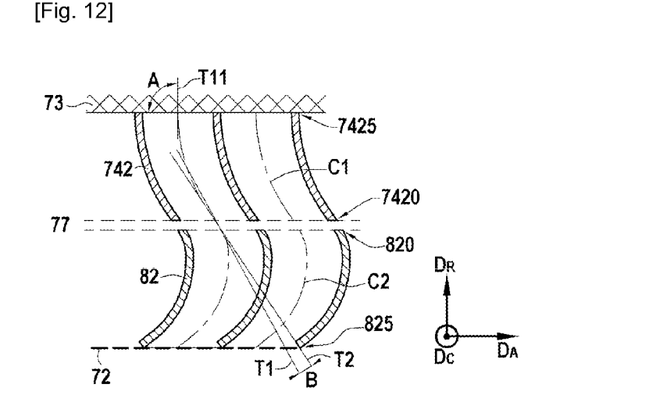
FIG. 12 is a zoom of FIG. 10 illustrating the arrangement of the first partitions an of the second partitions in the first position of the device.

As illustrated in FIG. 12, which is a zoom of FIG. 10 illustrating the arrangement of the first partitions 82 and of the second partitions 742 in the first position of the thrust reverser device 70 in the second embodiment, the curvature of the second partitions 742 of the acoustic treatment panel 74 is shown in FIG. 12 by a first curve C1, and the curvature of the first partitions 82 of the cascade 80 is shown by a second curve C2.

If it is considered that each partitions 742 and 82 is formed by the radial stacking of an infinity of cross sections, taken in a plane orthogonal to the radial direction $D_R$, it is possible to define a curve passing through the center of each cross section and extending over the entire height H of the acoustic treatment cell 710 which is formed by the assembly of the first curve C1 with the second curve C2 to the height H of the acoustic treatment cell 7.

The second partitions 742 of the acoustic treatment cell 74 comprise a first end 7420 facing said thrust reverser cascade 80 and a second end 7425 opposite to the first end 7420 and facing the acoustically reflecting wall 73.

And the first partitions 82 of the cascade 80 each comprise a first end 820 facing the acoustic treatment panel 74 and a second end 825 opposite to the first end 820 and facing the porous wall 72.

The second end 825 of the first partitions 82 is thus at the inlet of the acoustic treatment cell 710.

In addition, for each second partition 742, in a section plane comprising the axial direction $D_A$ and the radial direction $D_R$, the tangent T11 to the second partition 742 taken at the second end 7425 forms a first angle A with a plane parallel to said first plane comprised between 60° and 120°, the acoustically reflecting wall 73 extending in said first plane to the second end 7425 of the second partition 742.

The first curve C1 defines the first angle A with the first plane. The first angle A is formed between the first plane and the tangent to the end of the first curve C1 opposite to the end facing the second curve C2.

This orientation of the second partitions 742 of the acoustic treatment panel 74 at their second end 7425 allows defining a substantially radial orientation of the acoustic treatment cells 710, to avoid penalizing the operation of the resonator due to undesired acoustic reflections on the partitions.

In addition, for each first partition 82, in a section plane comprising the axial direction $D_A$ and the radial direction $D_R$, the tangent T2 to the first partition 82 at its first end 820 forms a second angle B with the tangent T1 to the second partition 742 at the first end 7420 when the thrust reverser device 70 is in said first position. The second angle B is comprised between −20° and +20°.

The first and second curves C1 and C2 define the second angle B. the second angle B is formed between the tangent to the first curve C1 at the end of the first curve C1 facing the second curve C2 and the tangent to the second curve C2 at the end of the second curve C2 facing the first curve C1.

In FIGS. 13 to 18, the turbomachine 1 comprises in this case a thrust reverser device 70 which can operate according to the operation described in FIGS. 1A and 1B.

Figure 13:
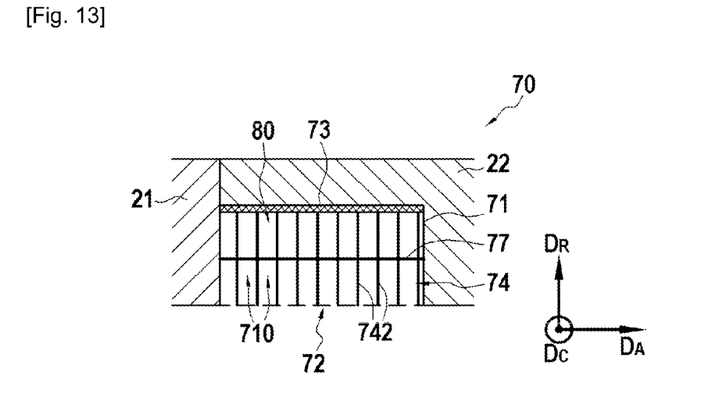
FIG. 13 shows a schematic section view in a plane comprising the axial direction and the radial direction of a cascade type thrust reverser device in a position in which thrust reversal is inactive according to a fourth embodiment of the invention.
Figure 14:
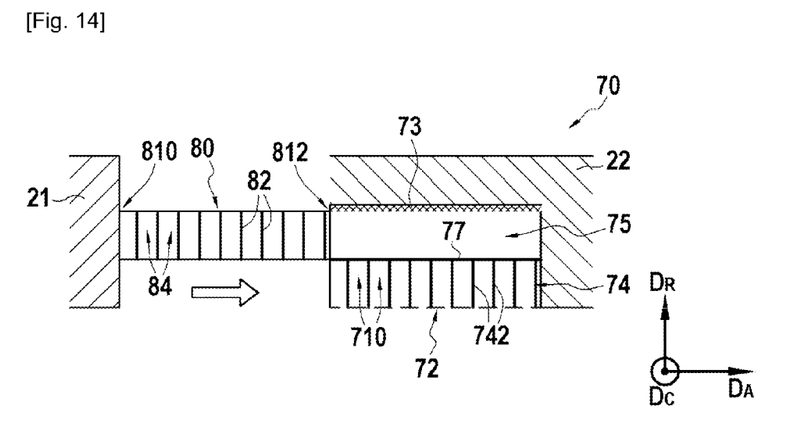
FIG. 14 shows a schematic section view in a plane comprising the axial direction and the radial direction of a cascade type thrust reverser device in a position in which thrust reversal is activated according to a fourth embodiment of the invention.

In FIGS. 13 and 14 are shown schematic section views in a plane comprising the axial direction $D_A$ and the radial direction $D_R$ of a cascade type thrust reverser device mounted on an aircraft turbomachine 1 according to a fourth embodiment of the invention and respectively in a position in which the thrust reversal is inactive and in a position in which the thrust reversal is activated.

Figure 16:
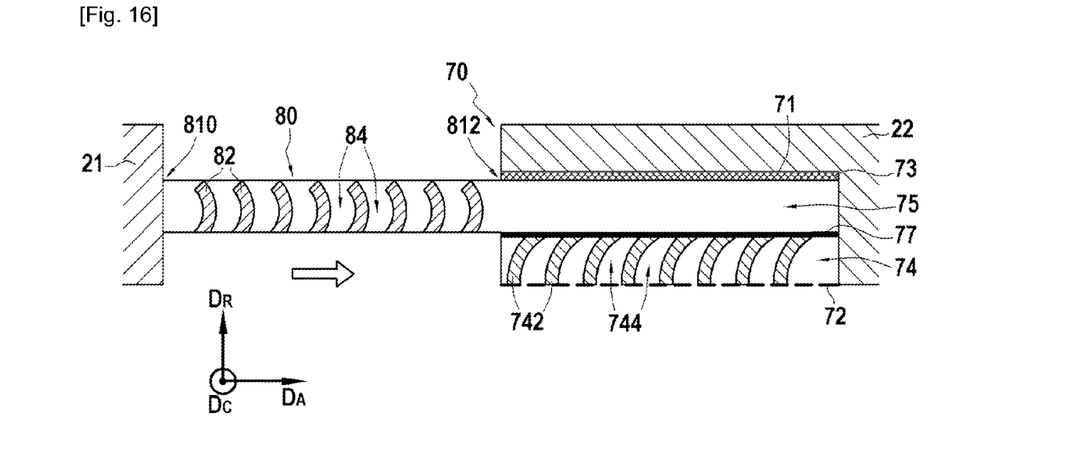
FIG. 16 shows a schematic section view in a plane comprising the axial direction and the radial direction of a cascade type thrust reverser device in a position in which the thrust reversal is activated according to a fifth embodiment of the invention.
Figure 18:
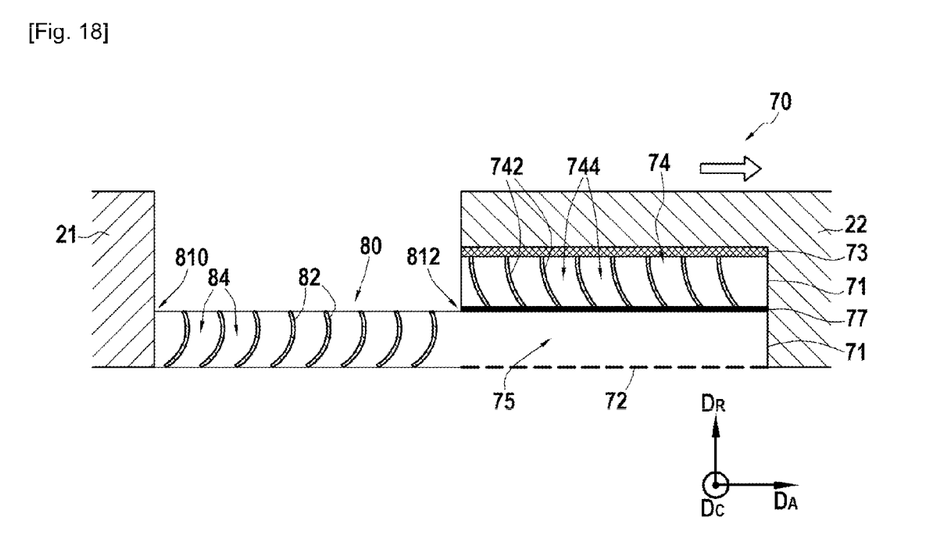
FIG. 18 shows a schematic section view in a plane comprising the axial direction and the radial direction of a cascade type thrust reverser device in a position in which thrust reversal is activated according to a sixth embodiment of the invention.

The fourth embodiment differs from the first embodiment in that the cascade 80 is secured to the upstream portion 21 of the nacelle 2 of the turbomachine 1 and the casing 71 is made in the downstream portion 22 of the nacelle 2. Thus, as illustrated in FIGS. 14, 16 and 18, in the embodiments illustrated in FIGS. 13 to 18 and being able to operate according to the operation described in FIGS. 1A and 1B, the first axial end 810 of the cascades 80 is fixed to an upstream portion 21 of the nacelle 2, movable with respect to a downstream portion 22 of the nacelle 2.

The casing 71 comprises an opening 76 communicating with the housing 75, the opening extending in a plane comprising the radial direction $D_R$ and the circumferential direction $D_C$ at an axial end of the casing 71 facing the upstream portion 21 of the nacelle 2.

When the thrust reversal is inactive, the thrust reverser device 70 is in a first position illustrated in FIG. 13 in which the cascade 80 is positioned in the housing 75 of the casing 71.

When the thrust reversal is activated, the thrust reverser device 70 is in a second position illustrated in FIG. 14 in which the cascade 80 is extracted from the casing 71 in the axial direction $D_A$, the casing 71 being in translation with the downstream portion 21 of the nacelle 2, leaving the housing 75 at least partially free.

Figure 15:
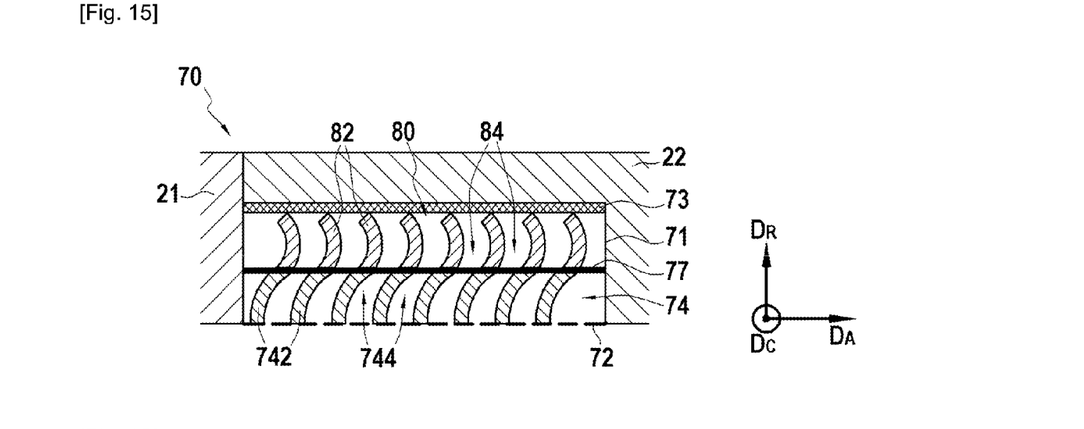
FIG. 15 shows a schematic section view in a plane comprising the axial direction and the radial direction of a cascade type thrust reverser device in a position in which the thrust reversal is in active according to a fifth embodiment of the invention.

Shown in FIGS. 15 and 16 are schematic section views in a plane comprising the axial direction $D_A$ and the radial direction $D_R$ of a cascade type thrust reverser device mounted on an aircraft turbomachine 1 according to a fifth embodiment of the invention and respectively in a position in which the thrust reversal is inactive and in a position in which the thrust reversal is activated.

The fifth embodiment differs from the second embodiment in that the cascade 80 is secured to the upstream portion 21 of the nacelle 2 of the turbomachine 1 and the casing 71 is made in the downstream portion 22 of the nacelle 2.

Figure 17:
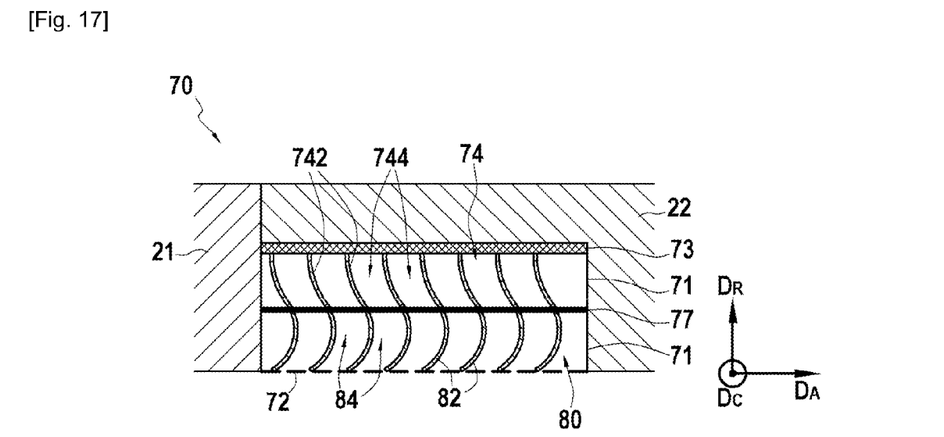
FIG. 17 shows a schematic section view in a plane comprising the axial direction and the radial direction of a cascade type thrust reverser device in a position in which thrust reversal is inactive according to a sixth embodiment of the invention.

Shown in FIGS. 17 and 18 are schematic section views in a plane comprising the axial direction $D_A$ and the radial direction $D_R$ of a cascade type thrust reversal device mounted on an aircraft turbomachine 1 according to a sixth embodiment of the invention and respectively in a position in which the thrust reversal is inactive and in a position in which the thrust reversal is activated.

The sixth embodiment differs from the third embodiment in that the cascade 80 is secured to the upstream portion 21 of the nacelle 2 of the turbomachine 1 and the casing 71 is made in the downstream portion 22 of the nacelle 2.

The invention thus supplies a cascade type thrust reverser device which allows both reorienting an air flow upstream of the turbomachine outside the nacelle and minimizing the head losses through the cascade when the thrust reversal is activated, and maximizing the effectiveness of acoustic absorption when the thrust reversal is inactive.

The invention claimed is:

1. A cascade type thrust reverser device for a turbomachine of an aircraft, comprising a thrust reverser cascade and a casing, the cascade extending in a first plane defining a first direction and a second direction and including first cavities, the casing comprising an opening extending in a second plane defining the first direction and a third direction and the opening extending in the third direction orthogonal to said first direction and defining a housing wherein the cascade can be inserted in said first direction, and the casing and said cascade being in relative translation with respect to one another in the first direction between a first position of the device in which the cascade is entirely positioned in the housing and a second position of the device in which said cascade is at least partially outside said housing, wherein the casing comprises an acoustic treatment panel including second cavities extending in a third plane parallel to the first plane, each cavity of the first cavities facing each cavity of the second cavities when the device is in the first position to form an acoustic treatment cell comprising the first cavity and the second cavity.

2. The cascade type thrust reverser device according to claim 1, wherein said thrust reverser cascade comprises first partitions positioned successively in the first direction and parallel to one another and second transverse partitions intersecting said first partitions and each extending in planes parallel to one another and parallel to the first direction, said acoustic treatment panel comprises third partitions positioned successively in the first direction and parallel to one another and fourth transverse partitions intersecting said third partitions and each extending in planes parallel to one another and parallel to the first direction, the first cavities each being defined by two of the first partitions and two of the second transverse partitions, the second cavities each being defined by two of the third partitions and two of the fourth transverse partitions, and each first partition of the first partitions is positioned in the continuation of each third partition of the third partitions in the third direction intersecting the first plane and each second transverse partition of the second transverse partitions is positioned in the continuation of each fourth transverse partition of the fourth transverse partitions in said third direction intersecting the first plane when the device is in said first position.

3. The cascade type thrust reverser device according to claim 2, wherein the third partitions of said acoustic treatment panel comprise a first end facing said thrust reverser cascade and a second end opposite to the first end, wherein the tangent to each third partition at the second end forms a first angle with a plane parallel to said first plane when the thrust reverser device is in said first position, the first angle being comprised between 60° and 120°.

4. The cascade type thrust reverser device according to claim 3, wherein the first partitions of said thrust reverser cascade comprise a first end facing said acoustic treatment panel and a second end opposite to the first end, wherein the tangent to each first partition at the first end of the first partition forms a second angle with the tangent to the third partition at the first end of the third partition when the thrust reverser device is in said first position, the second angle being comprised between −20° and +20°.

5. The cascade type thrust reverser device according to claim 2, wherein the first partitions of the cascade comprise a first curvature in a direction orthogonal to the first plane and the third partitions of the acoustic treatment panel comprise a second curvature in the direction orthogonal to the first plane distinct from the first curvature, the acoustic treatment cells formed in the first position of the thrust reverser device comprising two undulated walls orthogonal to the first direction and each formed by the first partitions and third partitions in the continuation of one another.

6. The cascade type thrust reverser device according to claim 1, wherein the first cavities and the second cavities have the same shape in a section plane parallel to said first plane.

7. The cascade type thrust reverser device according to claim 1, wherein the casing also comprises a porous interface with a thickness comprised between 0.5 mm and 20 mm, formed of at least one layer of porous material and positioned at the interface between said acoustic treatment panel and said cascade when the thrust reverser device is in the first position, the thickness extending in a direction perpendicular to said first plane.

8. The cascade type thrust reverser device according to claim 1, wherein the acoustic treatment cells have a height comprised between 10 mm and 100 mm in a direction perpendicular to the first plane.

9. The cascade type thrust reverser device according to claim 1, wherein the casing comprises a perforated wall and an acoustically reflecting wall each extending parallel to said first plane, the cascade and the acoustic treatment panel being positioned between the perforated wall and the acoustically reflecting wall when the thrust reverser device is in the first position.

10. The cascade type thrust reverser device according to claim 9, wherein said perforated wall is directly assembled by gluing to said cascade or to said acoustic treatment panel.

11. The cascade type thrust reverser device according to claim 9, wherein the acoustic treatment panel is positioned between the perforated wall and the thrust reverser cascade when the thrust reverser device is in the first position.

12. The cascade type thrust reverser device according to claim 9, wherein the acoustic treatment panel is positioned between the acoustically reflecting wall and the thrust reverser cascade when the thrust reverser device is in the first position.

13. The device according to claim 1, wherein the cascade is movable and the casing is fixed.

14. The device according to claim 1, wherein the cascade is fixed and the casing is movable.

15. A turbomachine intended to be mounted on an aircraft, the turbomachine comprising an axially symmetrical nacelle defining an axial direction and a radial direction, the nacelle including a thickness in the radial direction and a housing extending in the axial direction in the housing's thickness to accommodate a cascade of a cascade type thrust reverser device, wherein the turbomachine comprises the cascade type thrust reverser device according to claim 14, the cascade being positioned, when the thrust reversal is not required, in the the housing of the nacelle of the turbomachine.

16. An aircraft comprising at least one turbomachine according to claim 15.

* * * * *